(12) United States Patent
Kim et al.

(10) Patent No.: US 11,830,677 B2
(45) Date of Patent: Nov. 28, 2023

(54) MULTILAYER CAPACITOR

(71) Applicant: SAMSUNG ELECTRO-MECHANICS CO., LTD., Suwon-si (KR)

(72) Inventors: Hwi Dae Kim, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/369,161

(22) Filed: Jul. 7, 2021

(65) Prior Publication Data
US 2022/0181085 A1    Jun. 9, 2022

(30) Foreign Application Priority Data
Dec. 4, 2020 (KR) ................ 10-2020-0168788

(51) Int. Cl.
| | | |
|---|---|---|
| *H01G 4/012* | (2006.01) | |
| *H01G 4/232* | (2006.01) | |
| *H01G 4/248* | (2006.01) | |
| *H01G 4/30* | (2006.01) | |

(52) U.S. Cl.
CPC ............ *H01G 4/232* (2013.01); *H01G 4/012* (2013.01); *H01G 4/248* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 9,165,713 | B2 * | 10/2015 | Lee | H01G 4/012 |
| 10,332,685 | B2 * | 6/2019 | Kim | H01G 4/30 |
| 2007/0025054 | A1 * | 2/2007 | Tonogai | H01G 4/012 |
| | | | | 361/303 |
| 2011/0157765 | A1 * | 6/2011 | Kim | H01G 4/01 |
| | | | | 29/25.03 |

(Continued)

FOREIGN PATENT DOCUMENTS

| | | |
|---|---|---|
| KR | 10-2014-0142848 A | 12/2014 |
| KR | 10-1565641 B1 | 11/2015 |
| KR | 10-2020-0041246 A | 4/2020 |

*Primary Examiner* — Dion R. Ferguson
(74) *Attorney, Agent, or Firm* — MORGAN, LEWIS & BOCKIUS LLP (57) ABSTRACT

A multilayer capacitor includes a body including a multilayer structure in which a plurality of dielectric layers are stacked, a plurality of external electrodes, an active region including a plurality of internal electrodes, and an additional electrode region including a plurality of additional electrode layers. The plurality of additional electrode layers are connected to an external electrode, among the plurality of external electrodes, different from an external electrode which a most adjacent internal electrode among the plurality of internal electrodes of the active region is connected to, and $1<d/e\leq5$ in which e is a distance between adjacent internal electrodes among the plurality of internal electrodes and d is a distance between an internal electrode, among the plurality of internal electrodes, and an additional electrode layer, among the plurality of additional electrode layers of the additional electrode region, which are most adjacent to each other.

20 Claims, 10 Drawing Sheets

(56) References Cited

U.S. PATENT DOCUMENTS

| | | | | |
|---|---|---|---|---|
| 2014/0131082 A1* | 5/2014 | Ahn | ............... | H01G 4/30 |
| | | | | 361/301.4 |
| 2014/0133064 A1* | 5/2014 | Ahn | ............... | H01G 4/012 |
| | | | | 361/303 |
| 2014/0240895 A1* | 8/2014 | Lee | ............... | H01G 4/12 |
| | | | | 29/25.42 |
| 2014/0311783 A1* | 10/2014 | Lee | ............... | H01G 4/005 |
| | | | | 361/321.2 |
| 2014/0362492 A1* | 12/2014 | Lee | ............... | H01G 4/30 |
| | | | | 29/25.42 |
| 2016/0049252 A1* | 2/2016 | Park | ............... | H01G 4/30 |
| | | | | 174/258 |
| 2016/0189868 A1* | 6/2016 | Sasaki | ............... | H01G 4/012 |
| | | | | 361/301.4 |
| 2017/0084392 A1* | 3/2017 | An | ............... | H01G 4/008 |
| 2020/0043663 A1* | 2/2020 | Kim | ............... | H01G 4/30 |
| 2020/0118760 A1* | 4/2020 | Jun | ............... | H01G 4/30 |
| 2022/0181085 A1* | 6/2022 | Kim | ............... | H01G 4/232 |

\* cited by examiner

MULTILAYER CAPACITOR

CROSS-REFERENCE TO RELATED APPLICATION

This application claims benefit of priority to Korean Patent Application No. 10-2020-0168788 filed on Dec. 4, 2020 in the Korean Intellectual Property Office, the disclosure of which is incorporated herein by reference in its entirety.

TECHNICAL FIELD

The present disclosure relates to a multilayer capacitor.

BACKGROUND

A capacitor is an element capable of storing electricity. Generally, a principle in which two electrodes are opposed to each other and electricity is accumulated in each electrode and when a voltage is applied is used. When a direct current (DC) voltage is applied, electricity is accumulated and current flows in the capacitor, but when accumulation is completed, no current flows in the capacitor. On the other hand, when an alternating current (AC) voltage is applied, AC current continues to flow, while polarities of the electrodes are alternately changed.

According to types of an insulator provided between electrodes, capacitors are classified as an aluminum electrolytic capacitor in which aluminum electrodes are configured and a thin oxide film is provided between the aluminum electrodes, a tantalum capacitor using tantalum as an electrode material, a ceramic capacitor using a high-k dielectric material such as barium titanate between electrodes, a multilayer ceramic capacitor (MLCC) in which high-k ceramics having a multilayer structure is used as a dielectric material provided between electrodes, a film capacitor using a polystyrene film as a dielectric material between electrodes, and the like.

The MLCCs, among the capacitors, which advantageously have excellent temperature characteristics and frequency characteristics and may be realized in a small size, have recently been commonly applied in various fields such as high frequency circuits. In recent years, attempts to implement a smaller multilayer ceramic capacitor continue, and to this end, a dielectric layer and an internal electrode are formed to be thin.

In the case of a multilayer ceramic capacitor, an end of an internal electrode thereof may be difficult to control in shape or physical properties due to factors such as materials, process conditions, etc. and has a higher possibility of defects. Thus, there is a high probability that dielectric breakdown occurs at the end of the internal electrode even when a weak electric field is applied, and therefore, a method of improving withstand voltage characteristics at an interface between the internal electrode and a dielectric layer, particularly, at the end of the internal electrode is required.

SUMMARY

An aspect of the present disclosure may provide a multilayer capacitor having improved withstand voltage reliability.

According to an aspect of the present disclosure, a multilayer capacitor may include a body including a multilayer structure in which a plurality of dielectric layers are stacked, a plurality of external electrodes disposed outside the body, an active region including a plurality of internal electrodes stacked with the dielectric layer interposed therebetween in the body and connected to at least one of the plurality of external electrodes, and an additional electrode region including a plurality of additional electrode layers disposed in a position covering at least one of upper and lower portions of the active region in the body and connected to at least one of the plurality of external electrodes. The plurality of additional electrode layers may be connected to an external electrode, among the plurality of external electrodes, different from an external electrode which a most adjacent internal electrode among the plurality of internal electrodes of the active region is connected to, and $1<d/e\leq 5$ in which e is a distance between adjacent internal electrodes among the plurality of internal electrodes of the active region and d is a distance between an internal electrode, among the plurality of internal electrodes of the active region, and an additional electrode layer, among the plurality of additional electrode layers of the additional electrode region, which are most adjacent to each other.

The additional electrode region may include a first additional electrode region disposed above the active region and a second additional electrode region disposed below the active region, and at least one of the first and second additional electrode regions may satisfy the condition of $1<d/e\leq 5$.

The first additional electrode region may include a plurality of first additional electrode layers, the second additional electrode region may include a plurality of second additional electrode layers, and the first and second additional electrode layers may be connected to first and second external electrodes among the plurality of external electrodes, respectively.

The additional electrode region may satisfy the condition of $3\leq d/e\leq 5$.

The plurality of additional electrode layers of the additional electrode region may be connected to the same external electrode among the plurality of external electrodes.

At least one of the plurality of additional electrode layers of the additional electrode region may include a plurality of segments.

According to another aspect of the present disclosure, a multilayer capacitor may include: a body including a multilayer structure in which a plurality of dielectric layers are stacked, a plurality of external electrodes disposed outside the body, an active region including a plurality of internal electrodes stacked in the body with the dielectric layer interposed therebetween in a first direction, exposed from the body in a second direction perpendicular to the first direction, and connected to at least one of the plurality of external electrodes, and an additional electrode region including a plurality of additional electrode layers disposed in a position covering at least one of upper and lower portions of the active region in the body and connected to at least one of the plurality of external electrodes. The plurality of additional electrode layers may be connected to an external electrode, among the plurality of external electrodes, different from an external electrode which a most adjacent internal electrode among the plurality of internal electrodes of the active region is connected to, and $0.94\leq b/a<1$ in which a is a width of the plurality of internal electrodes of the active region and b is a width of the plurality of additional electrode layers of the additional electrode region, each width being measured in a third direction perpendicular to the first direction and the second direction.

The additional electrode region may include a first additional electrode region disposed above the active region and a second additional electrode region disposed below the active region, and at least one of the first and second additional electrode regions may satisfy the condition of $0.94 \leq b/a < 1$.

The first additional electrode region may include a plurality of first additional electrode layers, the second additional electrode region may include a plurality of second additional electrode layers, and the first and second additional electrode layers may be connected to external electrodes having different polarities among the plurality of external electrodes, respectively.

The additional electrode region may satisfy the condition of $0.94 \leq b/a \leq 0.98$.

The plurality of additional electrode layers of the additional electrode region may be connected to the same external electrode among the plurality of external electrodes.

At least one of the plurality of additional electrode layers of the additional electrode region may include a plurality of segments.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
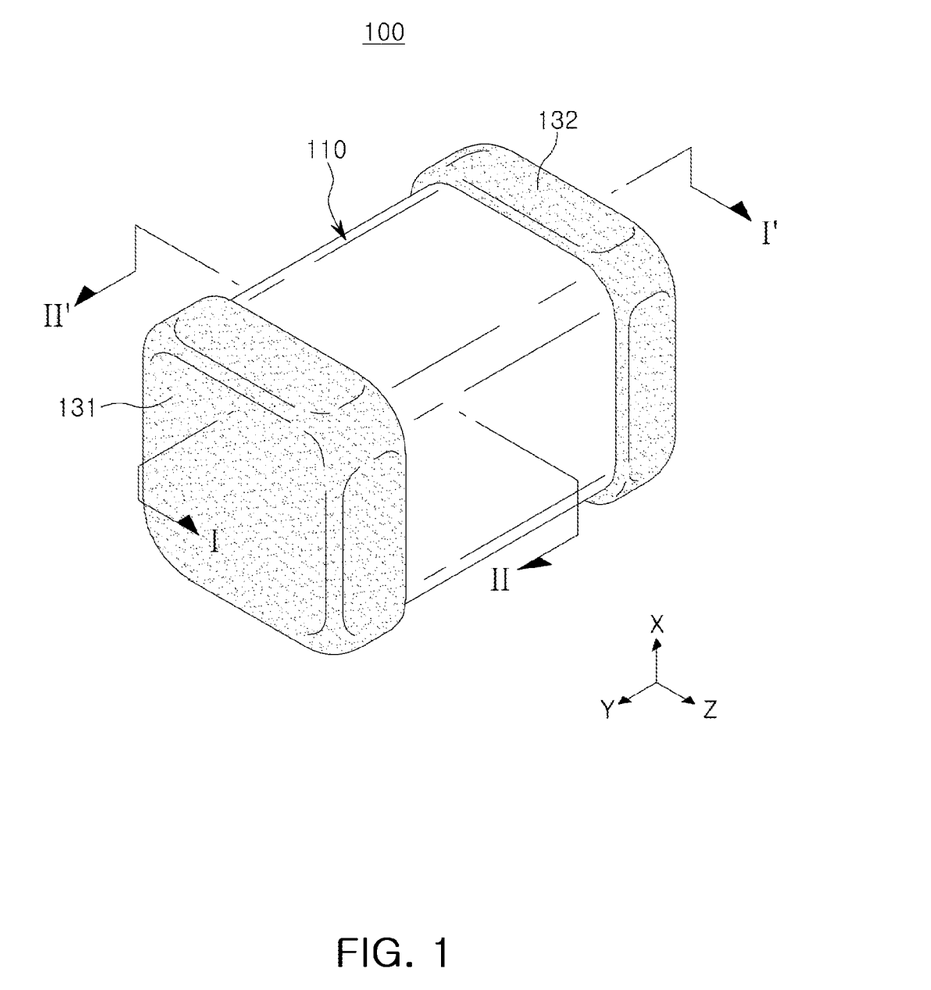
FIG. 1 is a perspective view schematically illustrating the exterior of a multilayer capacitor according to an exemplary embodiment in the present disclosure.
Figure 2:
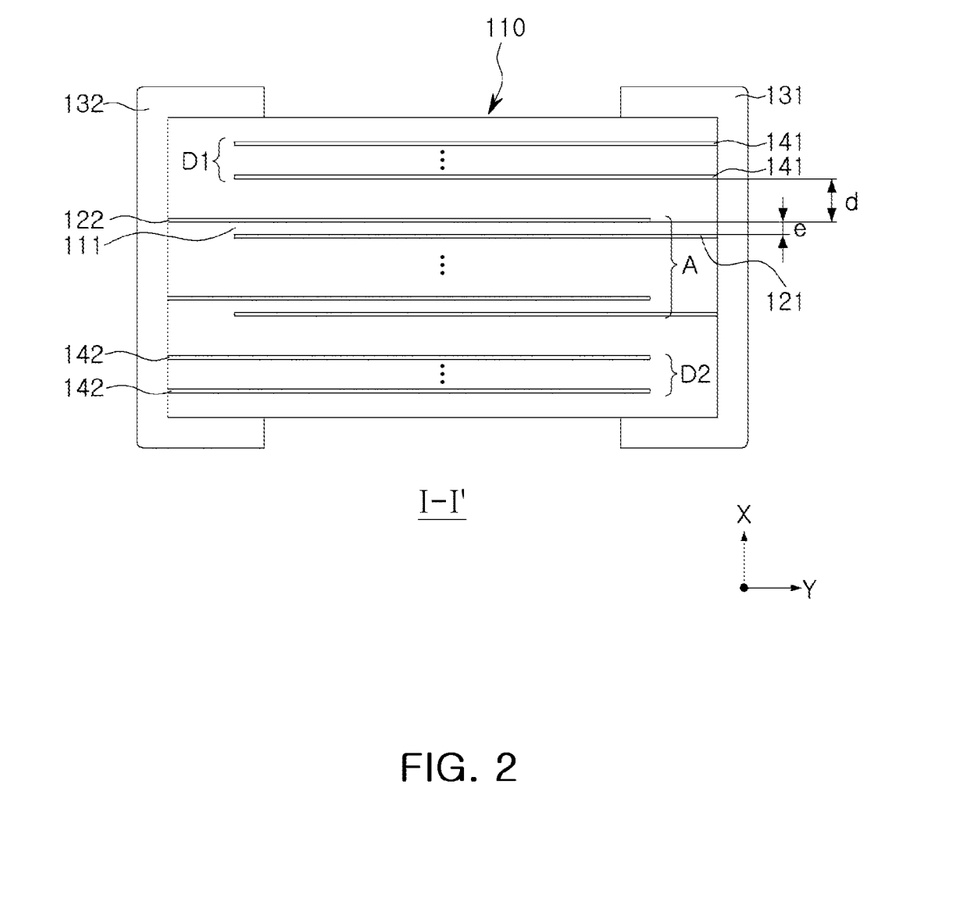
FIG. 2 is a cross-sectional view taken along line I-I' in the multilayer capacitor of FIG. 1.

FIG. 1 is a perspective view schematically illustrating the exterior of a multilayer capacitor according to an exemplary embodiment in the present disclosure. FIG. 2 is a cross-sectional view taken along line I-I' in the multilayer capacitor of FIG. 1. FIGS. 3 through 6 are cross-sectional views taken along line II-II' in the multilayer capacitor of FIG. 1.

Figure 3:
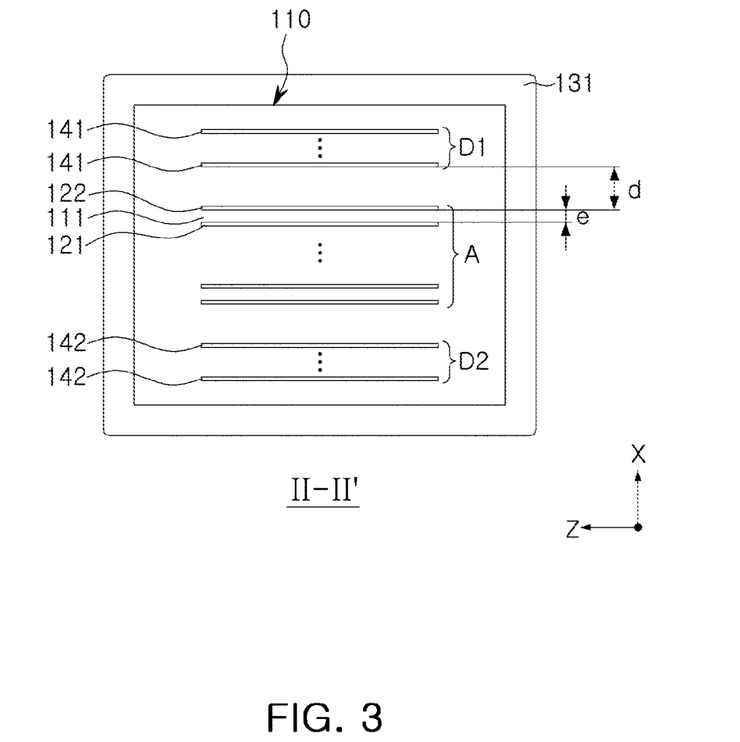
FIGS. 3 through 6 are cross-sectional views taken along line II-II' in the multilayer capacitor of FIG. 1.

Referring to FIGS. 1 through 3 together, a multilayer capacitor 100 according to an exemplary embodiment in the present disclosure includes a body 110 including a structure in which a plurality of dielectric layers 111 are stacked, a plurality of external electrodes 131 and 132, an active region A disposed inside the body 110, and additional electrode regions D1 and D2. Here, the plurality of additional electrode layers 141 and 142 included in the additional electrode regions D1 and D2 are connected to external electrodes 131 and 132 having different polarities from adjacent internal electrodes 141 and 142 of the active region A. Also, when a distance between adjacent internal electrodes 121 and 122 in the active region A is e and a distance between the active region A and the additional electrode regions D1 and D2 is d, a condition of $1 < d/e \leq 5$ is satisfied.

The body 110 includes a plurality of dielectric layers 111 and may be obtained, for example, by stacking a plurality of green sheets and then sintering the stacked green sheets. Through the sintering process, the plurality of dielectric layers 111 may have an integrated form. As shown in FIG. 1, the body 110 may have a shape similar to a rectangular parallelepiped. The dielectric layer 111 included in the body 110 may include a ceramic material having a high dielectric constant, for example, BT-based, i.e., a barium titanate ($BaTiO_3$)-based ceramic. However, other materials known in the art may be used as long as sufficient capacitance may be obtained. The dielectric layer 111 may further include additives, organic solvents, plasticizers, binders, and dispersants, if necessary, along with such a ceramic material as a main component. Here, in the case of additives, additives may be added in the form of metal oxides during a manufacturing process. An example of such a metal oxide additive may include at least one of $MnO_2$, $Dy_2O_3$, $BaO$, $MgO$, $Al_2O_3$, $SiO_2$, $Cr_2O_3$, and $CaCO_3$.

The plurality of internal electrodes 121 and 122 may be obtained by printing a paste containing a conductive metal with a predetermined thickness on one surface of the ceramic green sheet and then sintering the paste. In this case, when the stacking direction of the plurality of internal electrodes 121 and 122 is the first direction (an X direction in the drawing), the plurality of internal electrodes 121 and 122 may include first and second internal electrodes 121 and 122 exposed from the body 110 in a second vertical direction (a Y direction in the drawing) perpendicular to the first direction in the body 110. The first and second internal electrodes 121 and 122 are connected to different external electrodes 131 and 132 to have different polarities when driven, and may be electrically separated from each other by the dielectric layer 111 disposed therebetween. However, the number of the external electrodes 131 and 132 or a connection method thereof with the internal electrodes 121 and 122 may vary according to exemplary embodiments. Main constituent materials of the internal electrodes 121 and 122 may be Cu, Ni, Ag, Pd, etc., and alloys thereof may also be used.

The external electrodes 131 and 132 are formed outside the body 110 and include first and second external electrodes 131 and 132 connected to the first and second internal electrodes 121 and 122, respectively. Here, the first and second external electrodes 131 and 132 may be disposed to face each other in the second direction (the Y direction). The external electrodes 131 and 132 may be formed by preparing a material including a conductive metal as a paste and applying the paste to the body 110. Examples of a conductive metal may include nickel (Ni) and copper (Cu), palladium (Pd), gold (Au), or alloys thereof. Here, the external electrodes 131 and 132 may additionally include a plating layer including Ni, Sn, or the like.

The active region A is a region forming substantial electric capacitance in the multilayer capacitor 100 and includes a plurality of internal electrodes 121 and 122 stacked in the body 110 with the dielectric layer 111 interposed therebetween and connected to at least one of a plurality of external electrodes 131 and 132. The additional electrode regions D1 and D2 are disposed at a position that covers at least one of the upper and lower portions of the active region A and connected to at least one of the plurality of external electrodes 131 and 132. The plurality of additional electrode layers 141 and 142 may include a conductive material, for example, the same material as the internal electrodes 121 and 122.

In the present exemplary embodiment, the first additional electrode region D1 and the second additional electrode region D2 are respectively disposed above and below the active region A, but only either thereof may be provided on one side of the active region A. The plurality of additional electrode layers 141 and 142 are connected to an external electrode, among the plurality of external electrodes 131 and 132, having different polarities from an internal electrode most adjacent thereto, among the plurality of internal electrodes 121 and 122 of the active region A. For example, a plurality of first additional electrode layer 141 included in the first additional electrode region D1 may be connected to the first external electrode 131, and a plurality of second additional electrodes 142 included in the second additional electrode region D2 may be connected to the second external electrode 132 having a polarity different from the first external electrode 131. Also, in this case, the plurality of first additional electrode layers 141 may all be connected to the same external electrode, e.g., the first external electrode 131. Similarly, the plurality of second additional electrodes 142 may all be connected to the same external electrode, e.g., the second external electrode 132. In this case, at least one of the first and second additional electrode regions D1 and D2 may satisfy the condition of $1<d/e\leq 5$ described above.

In the present exemplary embodiment, in addition to the active region A, additional electrode regions D1 and D2 are disposed outside of the active region A in the first direction (the X direction), whereby concentration of an electric field on ends of the active region A may be alleviated. As described above, the additional electrode layers 141 and 142 are connected to the external electrodes 131 and 132 having opposite polarities to the adjacent internal electrodes 121 and 122, while a distance between the active region A and the additional electrode regions D1 and D2 is adjusted, thereby maximizing an effect of reducing (or relaxing) an electric field. Specifically, when a distance between adjacent internal electrodes among the plurality of internal electrodes 121 and 122 of the active region A is e and a distance between an internal electrode among the plurality of internal electrodes 121 and 122 of the active region A and an additional electrode layer among the plurality of additional electrode layers 141 and 142 of the additional electrode regions D1 and D2, which are most adjacent to each other, is d, a condition of $1<d/e\leq 5$ is satisfied. The inventors of the present disclosure found that, when the condition was satisfied, an electric field was not concentrated on the end of the active region A and could be effectively distributed to the additional electrode regions D1 and D2, without significantly affecting overall electric capacity of the multilayer capacitor 100. Also, as will be described later, when the additional electrode regions D1 and D2 satisfy the condition of $3\leq d/e\leq 5$, the effect of reducing an electric field could be most improved. Meanwhile, the value d may be obtained by measuring distances between the first and second internal electrodes 121 and 122 at a plurality of regions and averaging the measured values, and may also be obtained by measuring an average thickness of the dielectric layer 111 disposed between the first and second internal electrodes 121 and 122. The measurement may be performed by an optical microscope or a scanning electron microscope (SEM) at a cross-section of the body 110 shown in, for example, FIG. 2 or FIG. 3, although the present disclosure is not limited thereto. Other parameters may be measured in a similar manner. Other methods and/or tools appreciated by one of ordinary skill in the art, even if not described in the present disclosure, may also be used.

Figure 4:
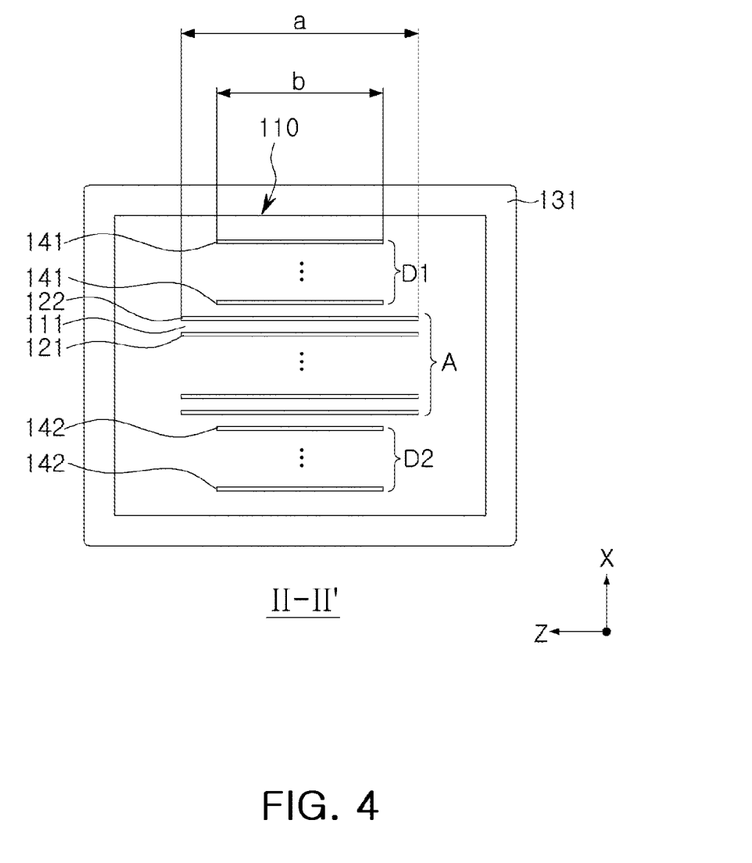
Figure 5:
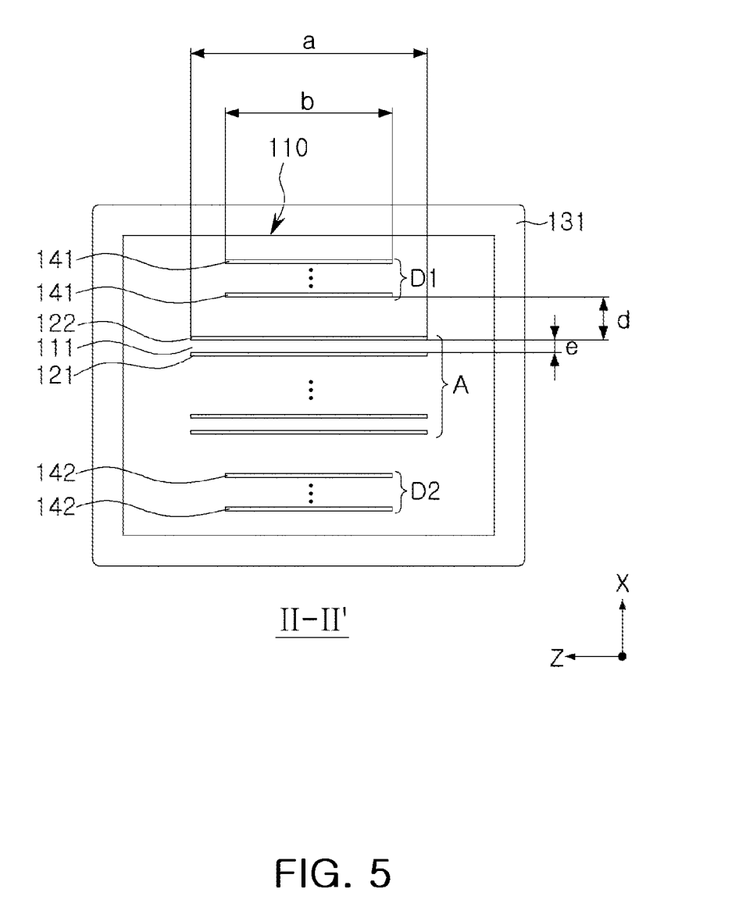

A modification of FIG. 4 is derived from the results of finding that even a width of the additional electrode layers 141 and 142 at the additional electrode regions D1 and D2 also affects an effect of distributing an electric field of the internal electrodes 121 and 122. In this case, an interval between the additional electrode regions D1 and D2 and the active region A does not need to satisfy the condition described in the previous exemplary embodiment. Referring to a part of the modification, not described in the previous exemplary embodiment, when a width of the plurality of internal electrodes 121 and 122 of the active region A is a and a width of the plurality of additional electrode layers 141 and 142 of the additional electrode regions D1 and D2 is b, a condition of $0.94\leq b/a<1$ is satisfied. Here, the widths of the plurality of internal electrodes 121 and 122 and the plurality of additional electrode layers 141 and 142 are based on widths measured in the third direction (a Z direction) perpendicular to the first direction (the X direction) and second direction (the Y direction). Also, the widths of the plurality of internal electrodes 121 and 122 and the plurality of additional electrode layers 141 and 142 may be obtained by averaging widths measured at a plurality of sampled regions. As a more preferable condition in terms of the electric field relaxation effect, the additional electrode regions D1 and D2 may satisfy the condition of $0.94\leq b/a\leq 0.98$.

The modification of FIG. 4 may be additionally applied to the previous exemplary embodiment and the following exemplary embodiment as long as the contents thereof are not contradictory. For example, as in the exemplary embodiment of FIG. 5, when both conditions of $1<d/e<5$ and $0.94\leq b/a<1$ described above are satisfied, the electric field relaxation effect at the end of the internal electrode may be further improved.

Figure 6:
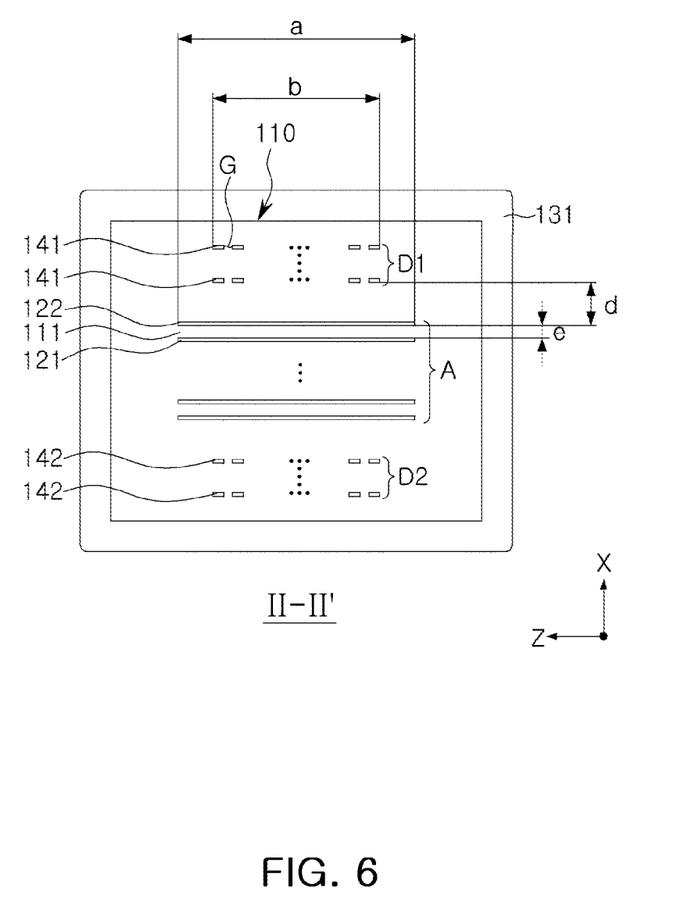
Figure 7:
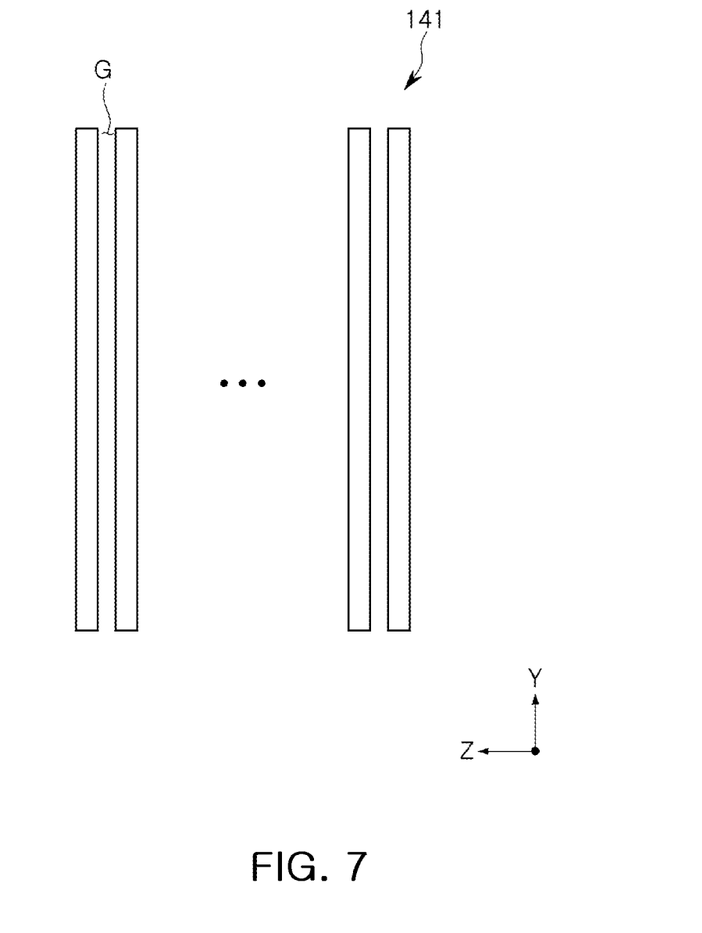
FIGS. 7 and 8 illustrate a shape of an additional electrode layer having a plurality of segments.
Figure 8:
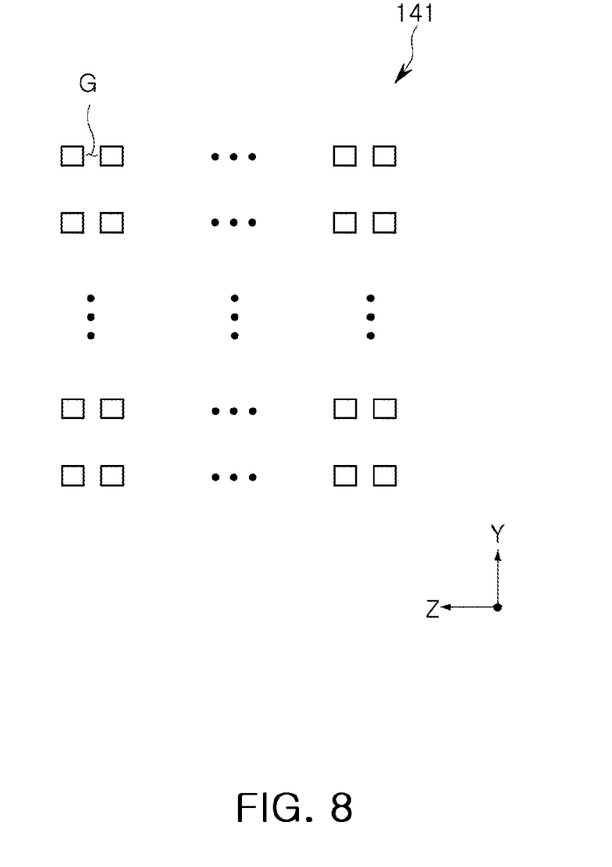

Another modification will be described with reference to FIGS. 6 through 8. In the exemplary embodiment of FIG. 6, at least one of a plurality of additional electrode layers 141 and 142 of the additional electrode regions D1 and D2 includes a plurality of segments. These segments are separated by a gap G and may be arranged in one direction to have a stripe shape as illustrated in FIG. 7 or may be implemented in a grid form as illustrated in FIG. 8. The additional electrode layers 141 and 142 having segments separated by the gap G may be more effective in reducing the electric field as they have a plurality of exposed side surfaces. Meanwhile, the exemplary embodiment of FIG. 6 is shown to be modified based on the exemplary embodiment of FIG. 5, but such a segment structure may also be applied to the exemplary embodiments of FIGS. 3 and 4 as well.

Figure 9:
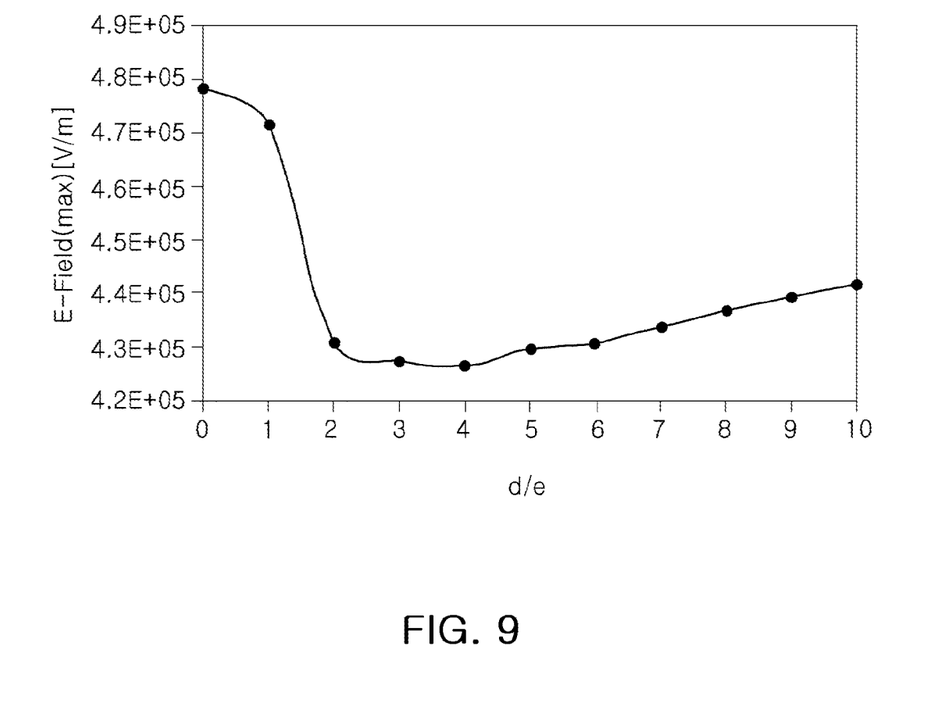
FIGS. 9 and 10 are simulation graphs illustrating a change in a maximum electric field value, while changing a shape of an additional electrode region.
Figure 10:
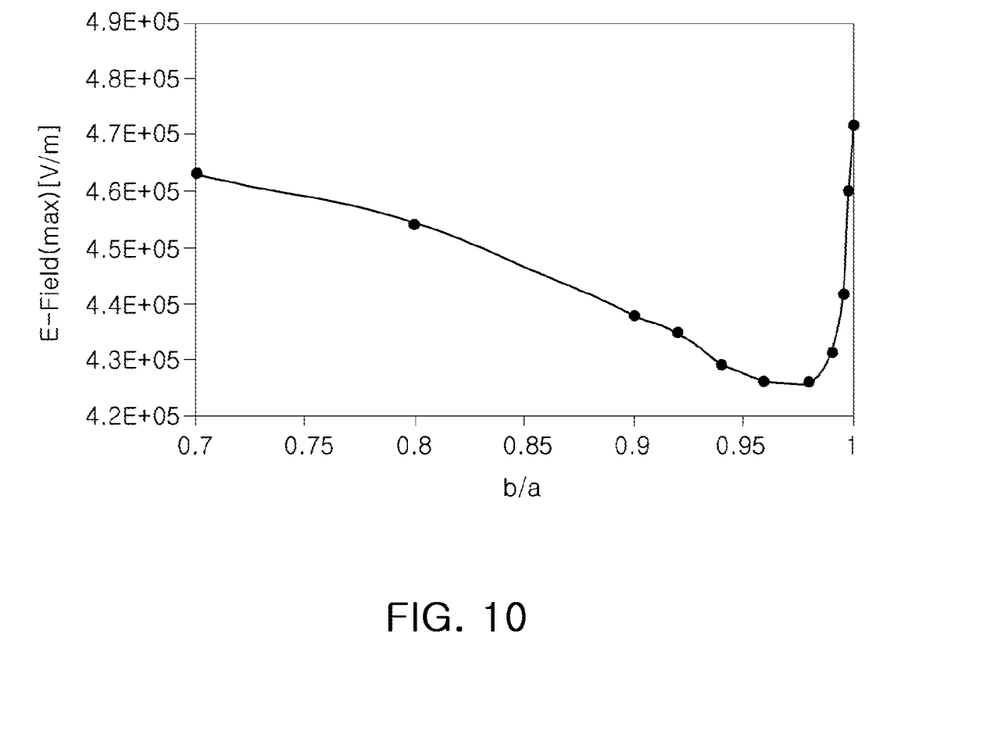

Hereinafter, the electric field relaxation effect of the aforementioned conditions related to the shape of the additional electrode regions will be reviewed. FIGS. 9 and 10 are simulation graphs illustrating a change in a maximum electric field value over a change in the shape of an additional electrode region. FIG. 9 shows a change in the electric field made as the value d/e is changed from 0 to 10. The electric field value was measured at a region corresponding to a thickness of half of the dielectric layer from the end of the active region in the third direction (the Z direction), and a maximum value among the values measured at a plurality of sampled regions is shown. Regarding experimental conditions, the additional electrode regions were disposed both above and below the active region and two additional electrode layers were disposed in each additional electrode region. Also, the value b/a was fixed to 1. Results of the experiment show that, as the value d/e was close to 1, an electric field reduction effect was reduced, which is understood that the additional electrode layer functions like an internal electrode in the active region. In addition, even when d/e increased, the electric field reduction effect was reduced. Meanwhile, since the thickness of the body also increases as d/e increases, smaller d/e is advantageous in terms of miniaturization of components. From this point of view, 1<d/e≤5 was set as a preferable condition, and when the condition of 3≤d/e≤5 was satisfied, the electric field relaxation effect was the best.

FIG. 10 shows a change in an electric field value made as the value b/a is changed from 0.7 to 1, and here, d/e was fixed to 1. As b/a was close to 1, the electric field reduction effect decreases, which is understood that the additional electrode layer functions like an internal electrode in the active region. As b/a was greater than 0.7, a maximum electric field value decreased, and 0.94≤b/a<1 was set as a preferred condition. When the condition of 0.94≤b/a≤0.98 was satisfied, the electric field relaxation effect was the best.

As set forth above, according to exemplary embodiments of the present disclosure, the multilayer capacitor has improved withstand voltage reliability.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising: a body including a multilayer structure in which a plurality of dielectric layers are stacked in a first direction;
   a plurality of external electrodes disposed outside the body;
   an active region including a plurality of internal electrodes stacked with the dielectric layer interposed therebetween in the body and connected to at least one of the plurality of external electrodes in a second direction perpendicular to the first direction; and
   an additional electrode region including a plurality of additional electrode layers disposed in a position covering at least one of upper and lower portions of the active region in the body and connected to at least one of the plurality of external electrodes,
   wherein the plurality of additional electrode layers are connected to an external electrode, among the plurality of external electrodes, different from an external electrode which a most adjacent internal electrode among the plurality of internal electrodes of the active region is connected to,
   at least two of the plurality of additional electrode layers that are most adjacent to the active region are connected to a first external electrode, among the plurality of external electrodes, having a different polarity from a second external electrode which said most adjacent internal electrode is connected to, one ends of the at least two of the plurality of additional electrode layers are connected to the first external electrode and the other ends of the at least two of the plurality of additional electrode layers are spaced apart from the second external electrode,
   1<d/e<5 in which 'e' is a distance between adjacent internal electrodes among the plurality of internal electrodes of the active region and 'd' is a distance between an internal electrode, among the plurality of internal electrodes of the active region, and an additional electrode layer, among the plurality of additional electrode layers of the additional electrode region, which are most adjacent to each other,
   widths of the plurality of additional electrode layers in the additional electrode region are substantially the same as each other, each width being measured in a third direction perpendicular to the first direction and the second direction, and the widths of the plurality of additional electrode layers in the additional electrode region are different from widths of the plurality of internal electrodes in the active region.

2. The multilayer capacitor of claim 1, wherein the additional electrode region includes a first additional electrode region disposed above the active region and a second additional electrode region disposed below the active region, and at least one of the first and second additional electrode regions satisfies the condition of 1<d/e≤5.

3. The multilayer capacitor of claim 2, wherein the first additional electrode region includes a plurality of first additional electrode layers, the second additional electrode region includes a plurality of second additional electrode layers, and the first and second additional electrode layers are connected to the first and second external electrodes among the plurality of external electrodes, respectively.

4. The multilayer capacitor of claim 1, wherein the additional electrode region satisfies the condition of 3≤d/e≤5.

5. The multilayer capacitor of claim 1, wherein the plurality of additional electrode layers of the additional electrode region are connected to the same external electrode among the plurality of external electrodes.

6. The multilayer capacitor of claim 1, wherein at least one of the plurality of additional electrode layers of the additional electrode region includes a plurality of segments.

7. A multilayer capacitor comprising: a body including a multilayer structure in which a plurality of dielectric layers are stacked;
   a plurality of external electrodes disposed outside the body;
   an active region including a plurality of internal electrodes stacked in the body with the dielectric layer interposed therebetween in a first direction, exposed from the body in a second direction perpendicular to the first direction, and connected to at least one of the plurality of external electrodes; and
   an additional electrode region including a plurality of additional electrode layers disposed in a position covering at least one of upper and lower portions of the active region in the body and connected to at least one of the plurality of external electrodes,
   wherein the plurality of additional electrode layers are connected to an external electrode, among the plurality of external electrodes, different from an external electrode which a most adjacent internal electrode among the plurality of internal electrodes of the active region is connected to,
   at least two of the plurality of additional electrode layers that are most adjacent to the active region are connected to a first external electrode, among the plurality of external electrodes, having a different polarity from a second external electrode which said most adjacent internal electrode is connected to,
   one ends of the at least two of the plurality of additional electrode layers are connected to the first external electrode and the other ends of the at least two of the plurality of additional electrode layers are spaced apart from the second external electrode, 0.94<b/a<1 in which 'a' is a width of one of the plurality of internal electrodes of the active region and 'b' is a width of one of the plurality of additional electrode layers of the additional electrode region, each width being measured in a third direction perpendicular to the first direction and the second direction, widths of the plurality of additional electrode layers in the additional electrode region are substantially the same as each other, each width being measured in the third direction, and the widths of the plurality of additional electrode layers in the additional electrode region are different from widths of the plurality of internal electrodes in the active region.

8. The multilayer capacitor of claim 7, wherein the additional electrode region includes a first additional electrode region disposed above the active region and a second additional electrode region disposed below the active region, and at least one of the first and second additional electrode regions satisfies the condition of $0.94 \leq b/a < 1$.

9. The multilayer capacitor of claim 8, wherein the first additional electrode region includes a plurality of first additional electrode layers, the second additional electrode region includes a plurality of second additional electrode layers, and the first and second additional electrode layers are connected to the first and second external electrodes among the plurality of external electrodes, respectively.

10. The multilayer capacitor of claim 7, wherein the additional electrode region satisfies the condition of $0.94 \leq b/a \leq 0.98$.

11. The multilayer capacitor of claim 10, wherein $1 < d/e \leq 5$ in which 'e' is a distance between adjacent internal electrodes among the plurality of internal electrodes of the active region and 'd' is a distance between an internal electrode, among the plurality of internal electrodes of the active region, and an additional electrode layer, among the plurality of additional electrode layers of the additional electrode region, which are most adjacent to each other.

12. The multilayer capacitor of claim 11, wherein $3 \leq d/e \leq 5$.

13. The multilayer capacitor of claim 7, wherein the plurality of additional electrode layers of the additional electrode region are connected to the same external electrode among the plurality of external electrodes.

14. The multilayer capacitor of claim 7, wherein at least one of the plurality of additional electrode layers of the additional electrode region includes a plurality of segments.

15. The multilayer capacitor of claim 7, wherein $1 < d/e \leq 5$ in which 'e' is a distance between adjacent internal electrodes among the plurality of internal electrodes of the active region and 'd' is a distance between an internal electrode, among the plurality of internal electrodes of the active region, and an additional electrode layer, among the plurality of additional electrode layers of the additional electrode region, which are most adjacent to each other.

16. The multilayer capacitor of claim 15, wherein $3 \leq d/e \leq 5$.

17. A multilayer capacitor comprising:

a body including a multilayer structure in which a plurality of dielectric layers are stacked in a first direction;

a plurality of external electrodes disposed outside the body;

an active region including a plurality of internal electrodes stacked with the dielectric layer interposed therebetween in the body and connected to at least one of the plurality of external electrodes in a second direction perpendicular to the first direction; and an additional electrode region including a plurality of additional electrode layers disposed in a position covering at least one of upper and lower portions of the active region in the body and connected to at least one of the plurality of external electrodes, wherein the plurality of additional electrode layers are connected to an external electrode, among the plurality of external electrodes, different from an external electrode which a most adjacent internal electrode among the plurality of internal electrodes of the active region is connected to, $1 < d/e \leq 5$ in which 'e' is a distance between adjacent internal electrodes among the plurality of internal electrodes of the active region and 'd' is a distance between an internal electrode, among the plurality of internal electrodes of the active region, and an additional electrode layer, among the plurality of additional electrode layers of the additional electrode region, which are most adjacent to each other, and at least one of the plurality of additional electrode layers of the additional electrode region includes a plurality of segments in a third direction perpendicular to the first direction and the second direction.

18. The multilayer capacitor of claim 17, wherein the additional electrode region includes a first additional electrode region disposed above the active region and a second additional electrode region disposed below the active region, and at least one of the first and second additional electrode regions satisfies the condition of $1 < d/e \leq 5$.

19. The multilayer capacitor of claim 18, wherein the first additional electrode region includes a plurality of first additional electrode layers, the second additional electrode region includes a plurality of second additional electrode layers, and the first and second additional electrode layers are connected to first and second external electrodes among the plurality of external electrodes, respectively.

20. The multilayer capacitor of claim 17, wherein the additional electrode region satisfies the condition of $3 \leq d/e \leq 5$.

* * * * *